United States Patent [19]

Corbin et al.

[11] Patent Number: 5,110,614

[45] Date of Patent: May 5, 1992

[54] PROCESS OF MAKING A MICROWAVEABLE BAKERY PRODUCT

[75] Inventors: Dennis Corbin; Scott Corbin, both of Oklahoma City, Okla.

[73] Assignee: MicroGold, Oklahoma City, Okla.

[21] Appl. No.: 451,115

[22] Filed: Dec. 14, 1989

[51] Int. Cl.⁵ .............................................. A23D 10/02
[52] U.S. Cl. ...................................... 426/555; 426/62; 426/237; 426/661
[58] Field of Search ................ 426/555, 62, 558, 661, 426/237

[56] References Cited

U.S. PATENT DOCUMENTS

| | | | |
|---|---|---|---|
| 3,250,625 | 5/1966 | Thelen | 99/86 |
| 4,109,025 | 8/1978 | Lauck | 426/552 |
| 4,181,747 | 1/1980 | Kickle et al. | 426/615 |
| 4,318,931 | 3/1982 | Schiffmann et al. | 426/243 |
| 4,344,969 | 8/1982 | Youngquest et al. | 426/18 |
| 4,350,713 | 10/1982 | Dyson et al. | 426/241 |
| 4,423,078 | 12/1983 | Darley et al. | 426/20 |
| 4,455,333 | 6/1984 | Hong et al. | 426/94 |
| 4,503,080 | 3/1985 | Brabbs et al. | 426/94 |
| 4,693,899 | 10/1987 | Hong et al. | 426/94 |
| 4,735,811 | 4/1988 | Skarra et al. | 426/128 |
| 4,752,484 | 6/1988 | Pflaumer et al. | 426/94 |
| 4,781,938 | 11/1988 | Plflaumer et al. | 426/549 |
| 4,857,340 | 8/1989 | Parliment et al. | 426/96 |
| 4,857,353 | 8/1989 | Jackson et al. | 426/554 |

*Primary Examiner*—Donald E. Czaja
*Assistant Examiner*—Helen Pratt
*Attorney, Agent, or Firm*—Kinney & Lange

[57] ABSTRACT

Disclosed is a premix and a complete mix for preparing bakery products suitable for microwave heating. The premix includes protein in an amount of 4.5 to 25.0 by weight and 7 to 50 shortening by weight. The premix may be combined with other ingredients to prepare a mix for preparing the bakery product. The mix may include from 46 to 80 parts flour, 4 to 22 parts shortening, and 4 to 11 parts protein material.

1 Claim, No Drawings

PROCESS OF MAKING A MICROWAVEABLE BAKERY PRODUCT

FIELD OF THE INVENTION

The present invention relates to starch-based food products and more particularly to bakery type foods to be heated or cooked in a microwave oven.

BACKGROUND OF THE INVENTION

Microwave cooking is based on the ability of microwaves to interact with the components of a food product and generate heat energy. The amount of interaction and subsequent heat that is generated is related to the composition of the food and the specific heat of each ingredient Food molecules which carry a di-polar electrical charge will vibrate as they align themselves with the rapidly fluctuating electric field. This causes heat of friction within the molecules. Since water carries a dipoler charge, foods containing high contents of water will generate a great deal of heat due to the reactiveness of water in a microwave.

Although microwave cooking is greatly influenced by the dielectric properties of ingredients, it is also affected by the food product's physical state, density, size, shape and thickness.

The greater a food product's density, the greater the microwave energy absorption and the lower the microwave penetration depth. Also, the shape of food and uneven patterns in a microwave can result in nonuniform temperature distributions.

In intermediate to low moisture foods such as baked goods, dramatically different patterns of starch transformation can exist which normally are responsible for poor textures such as toughening and cracking. This is known as staling. The primary problem is that dehydration cannot occur at the surface since the water within the product is continually being converted to steam and migrating out, causing evaporative cooling and condensation at the surface. This provides a wet or soggy surface texture. Water boils at 100° C. and its heat exchange capability diminishes as it evaporates as steam. The ability of ingredients to evenly distribute heat in a microwaveable bread will depend on both their specific heat and their relationship with water.

When starch imbibes water during gelatinization, increased heating rates will occur in that location due to interaction of microwave radiation with water. Because more intense heat results from microwave energy, starch's tolerance to textural breakdown is narrowed.

A critical moisture level exists for most starches below which gelatinization will not take place. This is usually around 30%. Gelatinized or swollen starch binds less water to its structure; therefore, more water is free to respond to the alternating microwave field resulting in heat build up and undesirable moisture migration.

Microwave heating of bread products results in the problem of rapid staling or toughening. This is most likely due to the non-uniform heating and increased range of starch gelatinization which takes place at the moisture level of the bread. Toughening or harsh chewiness of a microwaved bread product is attributed to accelerated staling, which is related to starch recrystallization and moisture migration.

Tests were conducted on commercially available precooked hamburger buns to determine the extent of moisture migration. The results were as follows:

TABLE I

| Location of Moisture | Commercial Hamburger Buns | | |
|---|---|---|---|
| | % Before Microwaving | % After | Change |
| Top Third | 29.02 | 35.15 | +6.13 |
| Middle Third | 34.67 | 34.86 | +0.19 |
| Bottom Third | 36.31 | 29.99 | −6.32 |
| Total Moisture | 100.00 | 100.00 | |

Total moisture loss was 13.12%

A noticeable staling and toughening of the product was noted.

GENERAL DESCRIPTION OF THE INVENTION

The present invention relates generally to preparation of bread products which are resistant to staling and toughening during microwave heating. Bakery products prepared according to the present invention also have reduced moisture migration during microwave heating of the bakery products. For example, the following Table II shows the effect of microwave heating of hamburger buns prepared according to the present invention. The buns were prepared as set forth in Example IV. Such testing was carried out in the same manner as the testing shown in Table I. Table II shows substantially less moisture migration with the present invention in contrast to that of commercially available buns.

The bakery products prepared according to the present invention may have an elevated fat content without fat migration in the product. The product includes generally non-fat dry milk and egg protein. The bakery product prepared according to the present invention further includes various other ingredients typically found in bakery products. The term "bakery products" as used herein means: a processed food product made from grain flour and various other ingredients, prepared for consumption through the process of baking. The product is usually offered for sale, "ready to eat", but may be sold in an unbaked or semi-baked state. Typical bakery products include, bread, cake, pie, sweet rolls, buns, doughnuts, cookies, crackers, ice cream cones, and pretzels.

| Location of Moisture | % Before Microwaving | % After | Change |
|---|---|---|---|
| Top Third | 29.08 | 32.77 | +2.69 |
| Middle Third | 36.82 | 37.49 | +0.67 |
| Bottom Third | 34.10 | 30.74 | −3.36 |
| Total Moisture | 100.00 | 100.00 | |

Total moisture loss was 5.47%

DETAILED DESCRIPTION OF THE PRESENT INVENTION

The present invention contemplates a premix that may be included in conventional bakery product production as well as bakery products including the composition of the pre-mix.

A premix is prepared for flour-based products suitable for heating in a microwave oven. The premix may include by weight from 22 to 55 parts flour, 4.5 to 25.0 parts protein and 7 to 55 parts shortening. The premix is prepared by first combining the protein and shortening to absorb the shortening into the protein and then adding the flour to the protein/shortening combination. The terms "parts", "percents" and the like as used herein will refer to "parts, percents and the like by weight".

A preferred premix may be prepared according to the present invention for making flour-based products for heating in a microwave oven by combining by weight from 0 to 20 parts dry milk solids, 7 to 55 parts of shortening, and 0 to 5 parts dried whole eggs. The protein material is present in an amount of from 4.5 to 25 parts. Then 22 to 55 parts high gluten flour and 0 to 20 parts dextrose are added. The premix is prepared by first combining the dry milk solids, eggs and shortening to absorb the shortening into said protein materials e.g. milk solids and eggs. Then the flour is added to the combination.

A complete mix according to the present invention is prepared for flour based products suitable for heating or reheating in a microwave oven, including by weight, from 46 to 80 parts flour, 4 to 22 parts shortening, and 6 to 11 parts protein material. The protein may be from 0 to 11 parts non-fat dry milk, and 0 to 6 parts egg solids. The complete mix further includes from 0 to 12 parts dextrose, 0 to 12 parts sugar, 0 to 3 parts corn starch, 0 to 1 part distilled monoglycerides and/or lecithin, 0 to 3 parts salt, and 0 to 2 parts microcrystalline cellulose. The complete mix is prepared by first combining the protein and shortening to absorb the shortening into the protein and then adding the flour and other dry ingredients to the protein/shortening combination.

The flour in the present invention may be any finely comminuted meal of any cereal grain or edible seed or mixtures as are typically used in baking. Examples of such flours include wheat flour, barley flour, rye flour, corn starch, and corn flour. Synthetic flours may be used which include such materials as starch in combination with soy protein. Wheat flours are the most typical flour used in baking and may include hard red spring, hard red winter, soft red winter and white winter and spring. The protein content of such flours typically varies from about 7% to about 14%. Any flour material that is suitable for use in baking may be used in the present invention.

The protein material used in the present invention will typically be dry milk solids and/or eggs. Various other proteins however, may be used such as soy isolate and other high protein materials. Egg protein may include dried whole eggs, fresh eggs and the like.

Shortening may be any oil or higher melting fat which is suitable for use in baked products. Shortenings contribute flavor and texture to the baked goods. Butter and/or margarine is suitable as the shortening. The present shortenings may be solid or plastic as well as liquid or semi-fluid. Glyceride shortenings derived from animal vegetable fats and oils including synthetically prepared shortenings. The glyceride may contain saturated or unsaturated long chain acyl radicals having from about 12 to about 22 carbon atoms generally obtained from edible oils and fats such as corn oil, cottonseed oil, soybean oil, coconut oil, rapeseed oil, peanut oil, olive oil, palm oil, palm kernel oil, sunflower seed oil, wall flower oil, lard, tallow and the like. Some preferred shortenings are soybean based shortenings or oils, hydrogenated soybean-based shortening or oil, corn oil, palm oil, hydrogenated palm oil, lard and tallow oils. Crisco TM brand shortening is commercially available from the Proctor and Gamble Company. Dry shortening may be used such as Beatrime TM which has a 70% to 72% fat level.

The present products will typically include a leavening agent such as yeast or chemical leavening agents. The latter includes such things as baking soda e.g. sodium potassium or ammonium bicarbonate alone or in combination with a baking acid. Preferably sodium aluminum phosphate, monocalcium phosphate, dicalcium phosphate or mixtures thereof. The leavening material will be used in an amount suitable to provide the desired degree of leavening.

Of course, in the final product, various other materials may be included such as flavorings e.g. spices, sweeteners, chocolate and the like.

EXAMPLE I

Three premixes A, B, C were prepared according to the present invention by combining the ingredients set forth in the following Table. The protein, e.g., the non-fat dry milk solids and the whole eggs were first combined. Next, the shortening was blended into the protein. The remaining ingredients were then combined with the resulting mixture.

| Raw Materials | Parts by Weight | | |
| --- | --- | --- | --- |
| | A | B | C |
| High gluten flour | 55.0 | 31.74 | 14.78 |
| Margarine | 7.0 | 38.08 | 50.00 |
| NFDM | 4.0 | 4.76 | 20.0 |
| Whole eggs | 2.0 | 4.76 | 5.0 |
| Sugar | 0 | 3.17 | 4.0 |
| Water | 26.8 | 13.65 | 5.0 |
| Cornstarch | 1.0 | 0.63 | 0.2 |
| Centrobake 100L* | 0.1 | 0.02 | 0.01 |
| Salt | 4.0 | 3.17 | 1.0 |
| Microcrystalline cellulose | 0.1 | 0.02 | 0.01 |

*A mixture of distilled monoglycerides and lecithin marketed by Central Soya Company.

The premix was subsequently used in preparing bakery products as hereinafter described.

EXAMPLE II

Three premixes A, B, and C were prepared according to the present invention by combining the ingredients set forth in the following table. The non-fat dry milk solids and the whole eggs were first combined. Next, the shortening was blended into the protein, e.g., milk solids and eggs. The remaining ingredients were then combined with the resulting mixture.

| Raw Materials | Parts by Weight | | |
| --- | --- | --- | --- |
| | A | B | C |
| Dried shortening | 40.00 | 53.87 | 55.0 |
| NFDM | 0.1 | 0.04 | — |
| Dried whole eggs | 1.0 | 1.49 | 3.0 |
| Cornstarch | 1.0 | 0.79 | 0.2 |
| Centrobake 100L | 0.1 | 0.03 | 0.01 |
| Salt | 5.0 | 3.97 | 2.0 |
| Microcrystalline cellulose | 0.1 | 0.03 | 0.01 |
| Dextrose | — | 0.00 | — |
| Sugar | 0.1 | 0.03 | — |
| High gluten flour | 52.6 | 39.76 | 39.78 |
| | 100.00 | 100.00 | 100.00 |

The premix was used as hereinafter described.

Example III

Three premixes were prepared according to the present invention by combining the ingredients set forth in the following table. The non-fat dry milk solids and the whole eggs were first combined. Next, the shortening was blended in. The remaining ingredients were then combined with the resulting mixture.

| Raw Materials | Parts by Weight | | |
|---|---|---|---|
| | A | B | C |
| Dried shortening | 25.0 | 42.46 | 50.0 |
| NFDM | 10.0 | 6.73 | 3.0 |
| Dried whole eggs | 1.0 | 3.89 | 5.0 |
| Cornstarch | 2.0 | 1.07 | 0.2 |
| Centrobake 100L | 0.5 | 0.03 | 0.02 |
| Salt | 1.2 | 0.85 | 0.3 |
| Microcrystalline cellulose | 0.3 | 0.03 | 0.01 |
| Dextrose | 20.0 | 17.12 | 15.0 |
| Sugar | — | 0.0 | — |
| High gluten flour | 40.0 | 27.83 | 26.47 |
| | 100.00 | 100.00 | 100.00 |

The premix was then used to prepare bakery products as hereinafter described.

EXAMPLE IV

Hamburger Buns

Hamburger buns were prepared according to the present invention by combining the following ingredients. The ingredients are expressed as percent by weight.

| | Control | Control | Present Invention | |
|---|---|---|---|---|
| | A | B | C | D |
| Flour | 50.62 | 57.41 | 48.24 | 42.15 |
| Water | 32.82 | 32.86 | 22.86 | 22.86 |
| Shortening | 4.67 | 2.74 | 11.49 | 14.95 |
| Sugar | 5.61 | 0.86 | 1.36 | 1.36 |
| Yeast | 2.80 | 3.00 | 4.76 | 4.76 |
| Milk Powder | 1.82 | 0.60 | 3.73 | 4.72 |
| Salt | 0.93 | 0.90 | 0.27 | 0.34 |
| Whole Egg Solids | 0.93 | 0.20 | 1.23 | 1.56 |
| Dextrose | — | 0.86 | 5.40 | 6.85 |
| Cornstarch | — | 0.05 | 0.34 | 0.43 |
| Centrobake 100L | — | 0.50 | 0.01 | 0.01 |
| Microcrystalline Cellulose | — | 0.01 | 0.01 | 0.01 |
| TOTAL | 100.00 | 100.00 | 100.00 | 100.00 |

Hamburger buns were prepared by first combining the milk powder and whole egg solids. Next the shortening in Products C and D were combined with the milk powder and egg solids. The remaining dry ingredients were then combined with the protein/shortening mixture. In the case of Products A and B, all dry ingredients were combined and then the shortening was added. Finally, the water was added with sufficient mixing to develop the dough. The dough for each of the products were divided into pieces sufficient to provide a finished hamburger roll of two ounces. Following baking the hamburger rolls were cooled to room temperature. Later, the rolls were reheated in a microwave. Substantial staling was noted with respect to baked Products A and B. In the case of baked Products C and D, minimal staling was noted and the rolls had characteristics substantially identical to fresh baked rolls. Data from Instron testing according to standard methods verified the observations regarding staling. The Instron testing of Product A was about 180 Kg of force before microwaving and slightly over 500 Kg of force following the microwave heating. The Instron testing of Product D was 247 Kg of force before microwaving and about 140 Kg after microwave heating.

EXAMPLE V

Cooked Pizza Crust

Four pizza crust products, e.g. Products A, B, C and D, were prepared as hereinafter described. Products A and B were conventional pizza dough products and Products C and D were prepared according to the present invention.

| | A | B | C | D |
|---|---|---|---|---|
| Flour | 65.77 | 63.79 | 52.12 | 48.15 |
| Water | 29.43 | 29.03 | 29.03 | 29.03 |
| Yeast | 2.40 | 3.00 | 5.22 | 5.30 |
| Milk Solids | — | 0.33 | 1.41 | 1.95 |
| Shortening | 0.60 | 2.37 | 10.41 | 14.22 |
| Sugar | 0.60 | 0.44 | 0.44 | 0.45 |
| Salt | 1.20 | 0.90 | 0.86 | 1.19 |
| Whole Egg Solids | — | 0.08 | 0.32 | 0.45 |
| Cornstarch | — | 0.04 | 0.17 | 0.24 |
| Centrobake 100L | — | 0.01 | 0.01 | 0.01 |
| Microcrystalline Cellulose | — | 0.01 | 0.01 | 0.01 |
| TOTAL | 100.00 | 100.00 | 100.00 | 100.00 |

Products A and B were prepared by first combining all of the dry ingredients. Then the shortening was added and thoroughly combined. Products C and D were prepared according to the present invention by combining the milk solids and egg solids. The shortening was thoroughly combined with this protein mixture. Then the remaining ingredients were combined. The water was added to each of the dry mixtures and mixed to develop a suitable dough. The amount of mixing was the same for each of the products. The dough was separated into balls of appropriate size for a pizza. The dough balls were pressed in a pizza mold and cooked in an oven at 600° F. for ten minutes. The cooked pizza dough was filled with pizza toppings. The products were frozen and packaged. Later, the products were removed from the package and cooked in a 600 watt microwave oven on high temperature for 1.5 minutes. Significant staling was noted with the control Products A and B. Minimal staling was noted with the present invention e.g. Products C and D.

EXAMPLE VI

White Bread—Normal

A white bread was prepared by combining the following ingredients. In the case of Products A and B, all dry ingredients were combined and the shortening was then added. With Products C and D, the milk powder and the egg solids were combined. The shortening was combined with this mixture and then the remaining dry ingredients were added.

| | Control | Control | Present Invention | |
|---|---|---|---|---|
| | A | B | C | D |
| Flour | 54.66 | 59.84 | 50.20 | 44.25 |
| Water | 32.98 | 31.88 | 21.88 | 21.88 |
| Shortening | 2.06 | 1.76 | 11.10 | 14.10 |
| Sugar | 4.12 | 1.64 | 3.23 | 3.76 |
| Yeast | 3.09 | 3.30 | 4.67 | 4.56 |
| Milk Powder | 2.06 | 0.57 | 3.61 | 4.59 |

-continued

|  | Control A | Control B | Present Invention C | D |
|---|---|---|---|---|
| Salt | 1.03 | 0.20 | 0.25 | 0.32 |
| Dextrose | — | 0.51 | 3.18 | 4.04 |
| Whole Egg Solids | — | 0.19 | 1.19 | 1.52 |
| Cornstarch | — | 0.05 | 0.32 | 0.40 |
| Centrobake 100L | — | 0.05 | 0.32 | 0.40 |
| Microcrystalline Cellulose | — | 0.01 | 0.05 | 0.08 |
| TOTAL | 100.00 | 100.00 | 100.00 | 100.00 |

In each product, the water was added to the dry ingredients with sufficient mixing to properly develop the dough. The products were divided into portions appropriate for a loaf of bread. The portions were baked under the same conditions and resulted in quality loaves of white bread. Loaves of each product were cooled to room temperature and later heated under the same conditions in a microwave. Products A and B had noticeable staling while no staling was noted in Products C and D.

EXAMPLE VII

Example VI was repeated using soy protein isolate in place of the milk powder and whole egg solids in an equal amount by weight. Similar results were obtained.

EXAMPLE VIII

A premix was prepared according to the present invention using each of the following formulations.

|  | A | B |
|---|---|---|
| Dried shortening | 25.00 | 52.00 |
| Isolate soy protein | 8.00 | 2.00 |
| Dried whole eggs | — | 5.00 |
| NFDM | — | — |
| Cornstarch | 2.00 | — |
| Centrobake 100L | 0.20 | 0.20 |
| Salt | 1.50 | 0.50 |
| Microcrystalline cellulose | 0.30 | 0.50 |
| Dextrose | 20.00 | 18.00 |
| High gluten flour | 41.50 | 21.98 |
|  | 100.00 | 100.00 |

The soy protein isolate was combined with the dried whole eggs. The shortening was them combined. The remaining ingredients were then combined. The premix was found to be suitable for use in preparing various bakery products. The resulting products were suitable for microwave heating without noticeable staling.

EXAMPLE IX

Empanada dough for frying was prepared according to the following formulation.

| Premix B from Example II | 66.00 parts |
|---|---|
| H&R Flour | 100.00 parts |
| Water | 50.00 parts |

A five pound batch was prepared by mixing the premix and flour. Water was added and mixed on high until the dough adhered together. This took approximately 5 minutes. Dough was rolled out to 1/16 inch in thickness and formed into shapes 2 inches in diameter. Each piece was filled with a meat filling, folded over and the edges were trimmed. The filled pieces were fried in oil at 350° F. for 2 minutes. The fried pieces were cooled for 1 hour, frozen and packaged. The frozen pieces were reconstituted in a microwave oven on high setting with a 600 watt oven for 40 seconds. Other frozen pieces were reconstituted in a conventional oven for 3 minutes at 300° F.

EXAMPLE X

Microwaveable Pie Dough was prepared having the following formulation.

| Premix B from Example I | 31.74% |
|---|---|
| Water | 15.75% |
| Shortening | 11.93% |
| H&R Flour | 40.58% |

A 5 pound batch was prepared. The premix was combined with water and set aside. Flour and shortening were mixed until the shortening formed small beads. In each case, the mixing was for 1 minute. The premix and the flour/shortening mixture were combined and mixed to develop the dough. The dough was refrigerated until the dough temperature was 40° F. The dough was sheeted out to the desired thickness, put into a pie pan, fruit was added, and dough sheet was added over the top. The pie was baked in an air impingement oven for 6 minutes at 400° F. with 200 lbs steam. The baked pie was cooled, frozen and packaged. One such pie, e.g. a 5 inch pie, was reconstituted by heating in a microwave on high setting with 600 watt oven. Heating was for 5 minutes. Minimal staling was noted. Another such pie was reconstituted in a conventional oven by heating 10 minutes at 300° F.

EXAMPLE XI

Microwaveable egg roll doughs were prepared according to the following formulation.

|  | Parts by Weight | |
|---|---|---|
| Premix B Example II | 32.51 | 66.00 |
| H&R Flour | 49.26 | 100.00 |
| Dried egg | 1.97 | 4.00 |
| Water | 16.26 | 33.0% |

First the premix, eggs and flour were combined with thorough mixing. Then the water was added with thorough mixing to provide a developed dough. The dough was sheeted to provide egg roll skins which was filled and deep fat fried.

EXAMPLE XII

Microwaveable croissants are prepared according to the following formula.

|  | Parts by Weight | |
|---|---|---|
|  | A | B |
| Premix B Example III | 31.27 | 80.00 |
| Yeast | 4.72 | 12.07 |
| Sugar | 1.35 | 3.45 |
| Water | 19.81 | 50.69 |
| Bread flour | 39.08 | 100.00 |
| Whole egg | 3.77 | 9.66 |

A 225 pounds batch of each formula was prepared using the straight dough method. The croissants were prepared according to the following steps.

The yeast and sugar were dissolved in the water and mixed with the egg at 80° F. The flour and premix were added to the above mixture and mixed until the dough was developed, e.g. about 8 minutes. The dough was put on a croissant laminating machine. The dough was retarded in a 40° F. cooler for 3 hours. The dough was sheeted to desired thickness, cut into triangles and rolled. The dough was proofed at 80° F. for 1-½ hours. The croissants were baked at 375° F. for 12 minutes. The baked product was cooled, frozen and packaged.

The frozen product was reconstituted as follows: A 600 watt microwave oven was operated on high setting. Product was placed in the microwave for 55 seconds. The product had minimal staling following the microwave reheating. A conventional oven was preheated to 300° F. Product was placed in the oven to thaw and heat at 300° F. for 6 minutes.

EXAMPLE XIII

Microwaveable white bread was prepared using the following formulation.

|  | Parts by Weight |
| --- | --- |
| Premix of B Example VIII | 77.38 |
| Budweiser yeast | 11.48 |
| Sugar | 3.28 |
| Water | 53.77 |
| General Mills all trumps high gluten flour | 100.00 |

Five pounds of bread were made using the straight dough method. The bread was prepared according to the following steps.

The yeast and sugar were dissolved in the water at 80° F. The flour and the premix were added to the above mixture and mixed until the dough was developed, e.g. approximately 4 minutes on medium speed. The dough was weighed into 5 oz. loaf pans and proofed for 1 hour at 100° F. The dough was cooked in a rotating rack oven for 18 minutes at 375° F. The bread was cooled at room temperature for 1 hour. The bread was frozen at 10° F. and packaged for storage.

A loaf of the frozen bread was reconstituted in a microwave oven on high setting for 1 minute. Minimal staling was noted. Another loaf of the bread was reconstituted in a conventional oven preheated to 300° F. This frozen loaf was thawed and heated at 300° F. for 8 minutes. Another loaf of the frozen bread was thawed and served at room temperature.

EXAMPLE XIV

Microwaveable flour tortillas were prepared according to the following formula.

|  | Parts by Weight |
| --- | --- |
| Flour | 100.00 |
| Water | 39.93 |
| Shortening | 4.95 |
| Premix B Example II | 20.13 |

A 165 pound batch was prepared with the straight dough method. The tortillas were prepared using the following steps:

The flour and premix were combined. The shortening was then added and combined. Water was added and mixed for 9 minutes. The dough was rolled and made into tortillas on a tortilla machine. The tortillas were baked for 1-½ minutes on a continuous belt oven at 400° F. The product was then cooled, frozen and packaged.

Product was reconstituted in a 600 watt microwave oven on high setting for 30 seconds. Minimal staling was noted. Product was reconstituted in a conventional oven, preheated to 350° F., thawed and heated for 2 minutes at 350° F.

EXAMPLE XV

Microwaveable biscuits were prepared using the following formula.

|  | Parts by Weight |
| --- | --- |
| Premix B Example II | 58.81 |
| Water | 58.81 |
| H&R flour | 100.00 |
| Shortening | 20.58 |
| Baking soda | 2.95 |
| Sodium Acid Phosphate | 2.36 |
| Sodium Alum Phosphate | 2.36 |

A five pound batch of dough was prepared using the following steps:

The premix and water were mixed and set aside. The flour, baking soda, SAP, and SALT were dry mixed and then added to the shortening with mixing. The premix/water mixture was added to the flour mixture and mixed for 2 minutes. The dough was rolled out to ¾ inch thick and cut with 2 inch round cutter. The dough pieces were cooked in a rotating rack oven for 14 minutes at 375° F. The cooked biscuits were cooled at room temperature, frozen and packaged.

The frozen product was reconstituted in a 600 watt microwave oven on high setting for 1 minute. Additional product was reconstituted in a conventional oven which was preheated to 400° F. The product was thawed and heated for 5 minutes at 400° F. Further product was thawed and served.

EXAMPLE XVI

Microwaveable cinnamon rolls were prepared using the following formulation.

|  | Parts by Weight |
| --- | --- |
| Premix B Example III | 80.00 |
| Budweiser yeast | 20.69 |
| Sugar | 17.24 |
| Cinnamon | .15 |
| Water | 57.93 |
| General Mills all trumps high gluten flour | 100.00 |

Five pounds were made using the straight dough method and using the following steps:

Yeast and the sugar were dissolved into the water at 80° F. The flour and the premix were added to the above mixture and mixed until the dough was developed, e.g. approximately 5 minutes. The dough was rolled out to ½ inch thick. The top of dough was brushed with butter, sprinkled with the sugar/cinnamon mixture. The dough was rolled up tightly and cut into pieces ½ inch apart and lay flat on pan. The dough was proofed for 1 hour at 100° F. and baked for 20 minutes at 400° F. The rolls were cooled at room temperature, frozen and packaged.

Some of the frozen rolls were reconstituted in a 600 watt microwave oven for 1 minute on high setting. Additional rolls were reconstituted in a conventional oven preheated to 300° F. The rolls were thawed and heated for 5 minutes at 300° F. Further rolls were thawed and eaten.

EXAMPLE XVII

Microwaveable raw pizza dough was prepared using the following formulation.

| | |
|---|---|
| Premix B Example III | 81.03% |
| Budweiser yeast | 12.07% |
| Sugar | 3.45% |
| Water | 56.90% |
| General Mills all trumps high gluten flour | 100.00% |

Five pounds of dough were made using the straight dough method and the following steps:

Yeast and the sugar were dissolved into the water at 80° F. The flour and the premix were added to the above mixture and mixed until the dough was developed, e.g. approximately 4 minutes. The dough was scaled and rolled out to proper thickness for 5 inch pizza. Pizza toppings were added for 5 inch pizza and frozen.

A pizza was reconstituted in a 600 watt microwave oven on high setting 2 minutes 30 seconds. Pizza was on susceptor board for browning. Minimal staling was noted. Another of such pizzas was reconstituted in a conventional oven preheated to 400° F. The pizza was cooked for 15 minutes at 400° F.

EXAMPLE XVIII

Microwaveable extruded dough was prepared using the following formulation.

| | Parts by Weight |
|---|---|
| Premix B Example III | 77.38 |
| Budweiser yeast | 11.48 |
| Sugar | 3.28 |
| Water | 53.77 |
| General Mills all trumps high gluten flour | 100.00 |

245 pounds of dough were made using the straight dough method and the following steps:

Yeast and the sugar were dissolved in the water at 80° F. The flour and the premix were added to the above mixture and mixed until the dough was developed, e.g. approximately 5 minutes. The dough was added to a Rheon Coextruder to form 4 oz pieces that included 55% dough and 45% meat filling. The product was proofed for 1 hour at 100° F. The proofed product was cooked at 325° F. for 5.8 minutes with 100 lbs steam in a continuous belt air impingement oven. The cooked product was cooled for 1 hour at room temperature. The cooked product was frozen and packaged.

Frozen product was reconstituted in a 600 watt microwave oven for 1 minute 15 seconds on high setting. Minimal staling was noted. Frozen products was reconstituted in a conventional oven preheated to 300° F. The product was thawed and heated at 300° F. for 12 minutes.

EXAMPLE XIX

Microwaveable pita bread was prepared according to the following formulation.

| | Parts by Weight |
|---|---|
| Premix B Example III | 15.00 |
| Budweiser yeast | 2.50 |
| Water | 62.00 |
| Flour | 100.00 |

180 pounds of dough were made with straight dough method using the following steps:

The yeast was dissolved into the water at 80° F. The flour and the premix were added to the above mixture and mixed until the dough was developed, e.g. approximately 6 minutes. The dough was formed on the Pita bread machine and then proofed for 30 minutes at 100° F. The proofed produce was baked on a continuous oven for 2 minutes. The baked product was cooled for 30 minutes at room temperature. The cooled product was sliced, frozen and packaged.

The frozen product was reconstituted in a 600 watt microwave oven on high setting 600 watt oven for 30 seconds. Minimal staling was noted. Pita bread was filled with meat and heated in a 600 watt microwave oven on high setting for 1 minute 15 seconds.

EXAMPLE XX

Microwaveable bagels were prepared according to the following formulation.

| | Parts by Weight |
|---|---|
| Premix B Example II | 48.31 |
| Flour | 100.00 |
| Sugar | 3.46 |
| Malt | 1.37 |
| Salt | .84 |
| Yeast | 7.84 |
| Water | 60.42 |

A 222 pound batch was made using the straight dough method and the following steps:

The yeast and sugar were dissolved in the water. The remaining ingredients were added to the mixture and mixed until the dough was developed, e.g. approximately 12 minutes. The dough was formed into a bagel on a bagel forming machine. The bagels were retarded in a 40° F. cooler for 12 hours. The dough was proofed for 1 hour at 100° F. The proofed dough was cooked in a stationary oven for 15 minutes at 400° F. and cooled for 1 hour at room temperature. The product was sliced using an automatic slicer. The product was frozen to 10° F. and packaged.

The frozen bagels were reconstituted in a 600 watt microwave oven on high setting with 600 watt oven for 45 seconds. Minimal staling was noted. Additional bagels were reconstituted in a conventional oven. The bagels were thawed and heated at 300° F. for 5 minutes. Further bagels were thawed and served.

EXAMPLE XXI

A complete dry bread mix was prepared suitable for use in making white bread according to the following formulations.

| | | |
|---|---|---|
| Dry shortening | 6.00% | 18.00% |
| NFDM | 0.10% | 4.00% |
| Dry eggs | 4.00% | .10% |
| Cornstarch | 0.00% | 3.00% |
| Distilled Monoglyceride, Lecithin | 0.00% | 3.00% |
| Salt | 0.00% | 3.00% |

| -continued | | |
|---|---|---|
| Monocrystalline Cellulose | 0.00% | 2.00% |
| Dextrose | 0.00% | 12.00% |
| Sugar | 12.00% | 10.00% |
| Flour | 77.90% | 54.90% |
| | 100.00% | 100.00% |

The dry mix was prepared by combining the non-fat dry milk and the dry eggs. The shortening was then combined with these protein materials and thoroughly mixed. Next, the other dry ingredients were added with thorough mixing.

Bread was prepared from each of the dry mixes, A and B, by adding 0.35 parts yeast and 1.65 parts water to 5.35 parts of the respective dry mix. Sufficient mixing was carried out to develop the dough. Dough portions were then placed in bread pans and baked in a conventional oven. The baked bread loaves were cooled and later reheated in a microwave oven. Commercially available bread loaves were similarly heated in the microwave oven. Significant staling and toughening was noted in the commercial bread loaves, whereas, very little staling and toughening was noted in the loaves prepared from dry mixes A and B.

EXAMPLE XXII

A raw pie dough crust was prepared by combining 1.76 parts milk powder and 1.76 parts whole egg solids. 26 parts shortening was then combined with the protein mixture with thorough mixing. Next, 47.8 parts flour, 0.23 parts cornstarch, 0.02 parts of a commercially available distilled monoglyceride and lecithin mixture, and 0.01 parts microcrystalline cellulose. The dry ingredients were thoroughly and uniformly mixed, then 20.8 parts water were mixed into the dry ingredients and mixed until the pie dough was adequately developed. The dough was then formed into a pie shell and frozen. The frozen pie shell was later removed and cooked in a microwave oven resulting in a cooked pie shell having excellent textural characteristics.

What is claimed is:

1. A method for preparing microwave oven reheated yeast leavened bread products comprising:
   preparing a premix, said premix comprising by weight from 25 to 40 parts flour, 25 to 50 parts of shortening, 4.5 to 25.0 parts protein material selected from the group consisting of egg protein, milk protein and soy protein 25 to 40 parts high gluten flour and 15 to 20 parts dextrose, said premix preparation having a first step consisting of combining the protein material and shortening to absorb said shortening into said protein material and then adding yeast and said flour to said combination;
   mixing the premix into a dough;
   baking said dough to form a bread product;
   cooling said bread product; and
   microwaving said bread product.

* * * * *